March 29, 1966 R. H. IMMEL 3,243,484
METHOD FOR INCREASING THE STRENGTH OF SANDWICH MATERIALS
HAVING FOAMED POLYMERIC CORES
Filed June 24, 1963
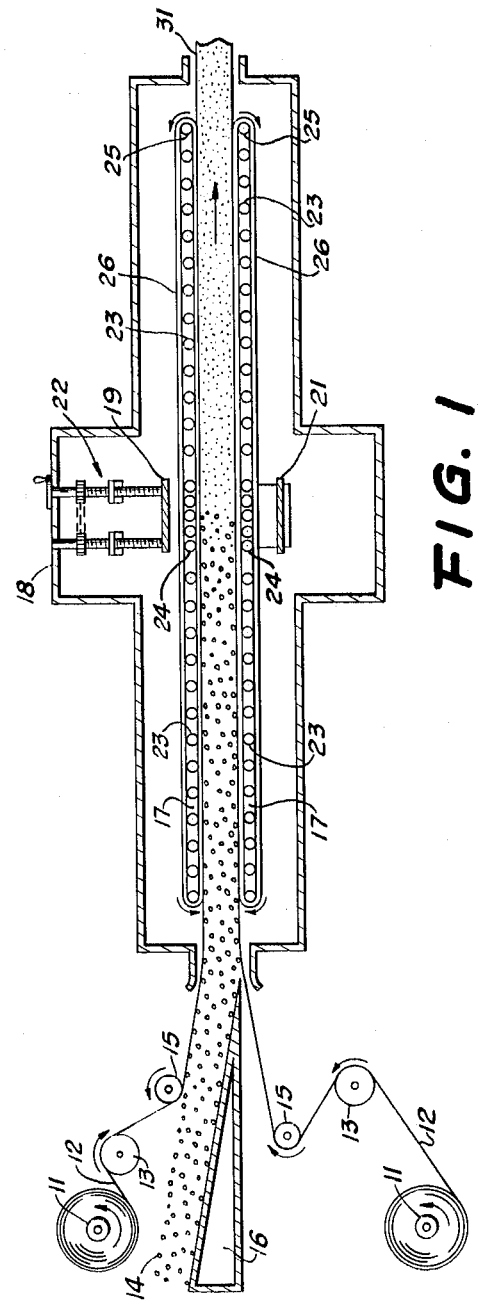
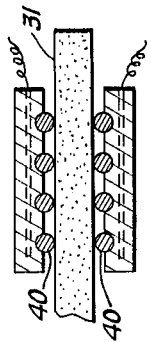
INVENTOR.
RICHARD H. IMMEL
BY *Olin E. Williams*
his *Attorney*

3,243,484
METHOD FOR INCREASING THE STRENGTH OF SANDWICH MATERIALS HAVING FOAMED POLYMERIC CORES
Richard H. Immel, Sewickley, Pa., assignor to Koppers Company, Inc., a corporation of Delaware
Filed June 24, 1963, Ser. No. 290,078
2 Claims. (Cl. 264—48)

This invention relates to a method for increasing the strength of cartons or containers made from sandwich-type materials having polymeric foam as a core.

In recent years the packaging industry has sought new construction materials for cartons or containers useful for shipping food and produce as well as certain other commodities which must be protected against varying moisutre and temperature conditions. One type of recently discovered carton construction material comprises a laminate, the surfaces of which are a paper, such as kraft paperboard, between which is adhered a core of foamed plastic material, such as foamed polystyrene. This type of material has found many uses, particularly in carton construction wherein an impact-resistant carton is desirable and also where an insulated moisture-proof type of carton is necessary.

A convenient method of preparing carton construction materials of the type hereinabove described comprises adhering, with an adhesive, spherical foamable polystyrene beads in a thin layer to surrounding sheets of kraft paperboard or other paper material sheets and thereafter heating and foaming the beads in place. Thus a sandwich comprised of surfaces of kraft paperboard having a core of expanded polystyrene is formed.

Because boxes and containers made of the particularly described laminates are adaptable for shipping food and produce under conditions wherein moisture conditions will vary, it is most imperative that the columnar compressive strength, e.g., the strength properties of the flat sandwich constructions determined in a direction parallel to the plane of the sheet of the sandwich, be as great as possible to prevent collapse of containers stacked one upon the other or to prevent collapse of containers having weight of any kind put thereon under conditions of heavy moisture. Because of use under varying moisture conditions, difficulties have been experienced in the collapse of containers made from the sandwich-like materials. An obvious solution to strengthening the sandwich-like materials would be to increase the thickness of the foam material contained within the surface of the kraft paper. However, this solution would result in detrimental effects, namely, the cost of the sandwich material would be increased and also the product shipping space would be reduced by the amount the boxes were thickened. Thus a two-fold loss would be obtained.

This invention contemplates a novel and simple method of increasing the columnar compressive strength of paperboard sandwich materials containing expanded polystyrene as a core material without the use of additional polymeric material and without an increase in the size of the sandwich materials.

In accordance with this invention, the columnar compressive strength of a laminated sandwich-type material, the surfaces of which comprise a paper material such as kraft paperboard and the core comprising expanded polystyrene, can be greatly increased by heating said laminated material whereby a thin layer of the expanded polystyrene immediately adjacent to the paper surfaces partially melts thereby forming a tough, hard layer of plastic adhered to the paper surfaces. The expanded polystyrene core not located immediately adjacent to the paper surfaces retains its original foam structure.

The strengthening of sandwich-type materials used for carton or container construction which materials contain expanded polystyrene as a core and kraft paperboard as surfacing is accomplished without the use of additional expanded polymer or extremely thick surface material by heating the sandwich-type material to a temperature at which the expanded polystyrene material immediately adjacent to the paperboard surfaces will partially melt and removing this heat-treated material from a heating zone thus forming a substantially continuous layer of hardened styrene polymer adjacent to the surface material, e.g., kraft paperboard. This final product is then capable of withstanding severe compression in a columnar direction under varying conditions of humidity.

The method of making the sandwich-type material which is used as the starting material of this invention may be accomplished in conventional manner. Conveniently, the core material comprises commercially available expandable polymeric materials. One such material is sold under the trademark Dylite. These expandable materials are usually in the form of beads or granules containing from 3–30 percent of a volatile expanding agent (an aliphatic hydrocarbon, for example) which boils below the melting point of the styrene polymer. Foamed styrene polymers are readily produced by heating these expandable beads or granules in a confining mold whereupon the polymer beads or spheres expand and fuse together to form a self-sustaining structure of foamed styrene polymer. The surface materials used to enclose the expanded polystyrene core are generally comprised of natural kraft, e.g., the so-called paper or liner board. Using these starting materials, the spherical beads may be adhered in a thin layer by an adhesive (e.g., various formaldehyde adhesives) between two kraft sheets prior to subjecting the materials to heat to cause expansion of the internal core expandable polystyrene. A suitable sandwich construction for the purpose of preparing containers is made by heating such an assembly between platens at a temperature of between about 250–275° F. for from 4–6 minutes followed by water cooling of the platens for a period of 4 minutes. The time and temperature used to cause expansion of the polymeric material may vary depending upon the particular expanding agent contained within the polystyrene granules.

As used herein, the term styrene polymer is intended to include homoploymers of syrene and copolymers of styrene that contain more than 50 percent and preferably more than 75 percent by weight of styrene. Examples of monomers that may be copolymerized with the styrene monomer include the conjugated 13-dienes, e.g., butadienes, isoprenes, etc. alpha-beta-unsaturated monocarboxylic acids and derivatives thereof, e.g., acrylic acid, methacrylate, ethylacrylate, butylacrylate, and the corresponding esters of methacrylic acid, acrylamide, acrylonitrile divinylbenzene, etc.

The expanding agents incorporated in the styrene polymer are usually aliphatic hydrocarbons boiling within a range of about 10° C. to about 100° C. Typical expanding agents include, for example, pentane, hexane, heptane, cyclopentane and petroleum ethers that boil within the indicated range. Usually 4–30 parts by weight of expanding agent is employed per 100 parts of styrene polymer.

As an alternative and convenient method of producing the sandwich-type materials which are modified according to the method of this invention, expandable polystyrene can be treated with a high loss factor material and then evenly disposed between kraft paper facing materials. The kraft facing materials having the expandable polymeric material interposed therebetween are then passed through a field of high frequency waves generated in a manner to cause a dielectric heating of the high-power loss factor covering the expandable polystyrene particles. As a result, there is a concomitant expansion of the particles into an integral cellular structure having a facing material adhered thereto.

In the practice of the invention, these sandwich-type materials are passed, for example, over a series of driven heated rolls placed for convenience of operation, at the discharge end of the high frequency field or at the discharge end of the hot platens between which fusion occurs and primary expansion takes place. While it is not necessary that the sandwich-type materials be immediately treated according to the process of this invention, it is of advantage to have the treatment occur at this particular location so as to provide for a continuous method of producing the high strength, sandwich-type materials.

Because polystyrene, for example, melts at about 330° F., temperatures of the driven rolls located subsequent to the expanding apparatus may be in a range between 330° F.–600° F. to provide for the partial melting of the polystyrene located immediately adjacent to the surface materials. Although a pressure from the rolls against the sandwich-type materials during this heating period may be applied, it is not necessary for the invention to be operable. A slight pressure may be of advantage to prevent further expansion of the polystyrene because of the pressure therein of any residual expanding agent.

The invention is further illustrated by further reference to the drawings wherein:

FIGURE 1 illustrates schematically apparatus for producing a sandwich-type material having a kraft paperboard surface and a core of foamed polymer, and FIGURE 2 illustrates schematically apparatus for creating a hard material adjacent to the surface of the kraft-paper facing materials.

A process for preparing the sandwich-type materials adaptable for use with this invention is illustrated schematically in FIGURE 1. As illustrated, the apparatus comprises a frame to which feed rolls 11 for supplying kraft paperboard facing material 12 are attached. The facing material passes over adhesive applicator rolls 13 and is held in position by guide rolls 15 for contact with expandable polymeric material 14. The expandable polymeric material is fed to the apparatus from a hopper (not shown) to feed means 16 such as a screw feeder. The feed means exert a pressure on the polymeric material during expansion. Polymeric material disposed between the flexible sheet 12 is passed between electrically insulated roller beds 17. The roller beds are enclosed by electrically insulating housing 18 which contain a high frequency generating unit of a conventional type. A high frequency field is generated between hot electrode 19 and the ground electrode 21. Spacing between the electrodes is regulated by an electrically insulated screw adjustor 22 attached to electrode 19 which can be moved up and down in a vertical direction. The electrically insulated roller beds 17 contain idling rolls 23 attached to supporting members (not shown). The supporting members are movable so that the thickness of the polystyrene material passing through the high frequency field can be regulated. The central idling rolls 24 are fastened to electrodes 19 and 21. The electrically insulated roller beds 17 are driven by driving rolls 25. Continuous belts 26 travel over driving rolls 25, idling rolls 23 and central idling rolls 24. The finished sandwich-type material containing foam polystyrene core may thereafter travel through a cooling zone.

As illustrated herein, in FIGURE 2, the resulting sandwich-type material is transported immediately to a series of driven heated rolls 40 located at the discharge end of the cooling zone of the apparatus of FIGURE 1. In the operation of the process of this invention, sandwich panels 31 are removed respectively from the apparatus of FIGURE 1 and travel over and under heated rolls 40 which rolls are heated to a temperature of between 330° F. to 600° F. As the sandwich-type materials pass between the heated rolls, the foamed polystyrene core material is caused to melt partially at the area 43 adjacent to the surface facing materials causing the polystyrene material to harden in this immediate area. If desired, the sandwich-type material during heating of the rolls may be maintained at constant thickness by the exertion of slight pressure on the upper and lower surface portions of the sandwich materials. Driven rolls 40 are adaptable for exerting such pressure. The thus heated and partially melted sandwich-type material may then be withdrawn from the apparatus without further treatment. There is thus provided a sandwich-type material comprising paperboard facing sheets having expanded polystyrene foam therebetween, and a thin layer of hard plastic immediately adjacent to the paper surfacing materials. The sandwich-type material has been strengthened by converting those portions of foam immediately adjacent to the facing materials into a hard solid mass without causing the sandwich-type material to increase any of its original size. The thus strengthened articles may be cut into a plurality of shaped articles for use in the manufacture of cartons.

To further illustrate the advantages of this invention, the following examples were conducted using the novel material produced from the process of this invention and those materials heretofore known in the prior art for the manufacture of containers.

EXAMPLE I

A series of sandwich materials comprising kraft paper surfaces having therebetween expanded foamed polystyrene were treated in the apparatus of FIGURE 2 at varying temperatures from 400° F. to about 600° F. Each of these series of sandwich-type materials, 10" x 5/8" high, were creased and folded to a 2½" square (the shape of a normal container or carton). The samples were then conditioned for 24 hours at the humidities indicated in Table I below. Since the physical properties of containers and cartons are affected by moisture, the testing samples were necessarily brought to constant weight under these humidity conditions before testing. The tests for columnar compressive strength were conducted in the same general area under the same conditions of temperature and humidity. After conditioning, the sample materials were then placed into an Instron Tester (test for compressive strength in pounds) and a load applied through the apparatus which load was distributed evenly to each sample carton.

For comparison a small box prepared from a typical commercial corrugated paper (200-pound test A flute) and a box prepared from foam core sandwich materials which were not treated according to this invention were also conditioned in the same manner as the materials of this invention and columar compressive strength obtained under the same conditions of relative humidity and temperature. Results of the tests conducted on these prior art materials are also set forth below in Table I.

TABLE I

COLUMNAR COMPRESSIVE STRENGTHS[1]

| Type Board | Columnar Compressive Strength, Pounds | |
|---|---|---|
| | 50% R.H. | 95% R.H. |
| Corrugated (200-Pound Test A Flute) | 299 | 72 |
| Non-Treated Foam Core Paperboard [2] | 180 | 80 |
| Heat-Treated Foam Core Paperboard [2] | 277 | 138 |

[1] Test Procedure: 10" x 5/8" high sample, creased and folded to a 2½" square and placed in the "Instron." Samples conditioned for 24 hours in the humidity indicated.
[2] 42 pounds kraft liner, 1.0 pcf Dylite expandable polystyrene F-40 core; overall thickness approximately ¼".

Several other samples of foam sandwich materials treated according to this invention were tested in the above-described manner and in all cases columnar compressive strengths were equal to or better than that shown in Table I.

Based upon the results obtained from these tests, it is obvious that there is a tremendous increase in columnar compressive strength of the sandwich materials treated in accordance with this invention as opposed to carton-forming materials heretofore known. It is particularly impressive to note that the sandwich materials which have been treated in accordance with this invention are at least one third stronger than those materials which have not been treated in accordance with the method of this invention.

Although I have described certain methods for applying heat to the sandwich-type materials, it should be understood that I may utilize any suitable method for heating these materials including heating with hot air, with dry steam, by infrared radiation, or by contact with hot liquids which do not dissolve the expanded polystyrene. Thus, heat may suitably be provided by causing dry steam to impinge on the sandwich-type materials or by placing them under a radiant heat source or in a hot air oven or under a gas flame or electrical resistance elements.

The present invention provides a method of making foamed polymeric sandwich-type panels of improved strength in the columnar direction. Thus, the invention is readily adaptable to be used in preparing carton-like materials which are subject to the application of stacking or loading under varying humidity conditions without fear of buckling or collapse of the boxes in service. The materials treated according to this invention remain rigid to provide proper protection for packaged contents particularly in those areas wherein boxes are used for products that must be refrigerated in shipment.

I claim:

1. A method of increasing the columnar compressive strength of flat, preformed sandwich type structural materials having surfaces of paper adhered to a core of expanded styrene polymer foam comprising introducing said materials into a heating zone maintained at a temperature of from 330–600° F. such that heat is applied to the outer portion of said surfaces of paper, maintaining said materials in said zone until the polymer foam immediately adjacent to the paper surfaces becomes heated and partially melts and thereafter removing said material, whose dimensions are substantially unchanged by said heating, from said heating zone whereby the polymer immediately adjacent to said paper surfaces cools and hardens to form substantially continuous layers of hard plastic immediately adjacent to said paper surfaces.

2. A method of increasing the columnar compressive strength of flat, preformed sandwich type structural materials having surfaces of paper adhered to a core of expanded styrene polymer foam comprising passing said materials between a series of driven heated rolls maintained at a temperature of from 330–600° F. to cause said polymer foam immediately adjacent to the paper surfaces to partially melt while simultaneously exerting a slight pressure on the upper and lower surface portions of said structural materials by means of said rolls to maintain said materials at substantially constant thickness and thereafter removing said materials from said rolls such that the polymer immediately adjacent to said paper surfaces cools and hardens to form continuous layers of hard plastic immediately adjacent to said paper surfaces.

References Cited by the Examiner

UNITED STATES PATENTS

| 2,722,719 | 11/1955 | Altstadter. |
| 2,767,436 | 10/1956 | Noland et al. |
| 2,867,222 | 1/1959 | Otto et al. _____ 264—321 XR |
| 2,878,153 | 3/1959 | Hacklander _____ 264—321 XR |
| 2,898,632 | 8/1959 | Irwin et al. |
| 2,917,217 | 12/1959 | Sisson. |
| 2,957,793 | 10/1960 | Dickey. |
| 2,998,501 | 8/1961 | Edberg et al. _____ 264—47 XR |
| 3,039,911 | 6/1962 | Fox _____ 264—321 XR |
| 3,062,698 | 11/1962 | Aykanian _____ 156—322 XR |
| 3,099,516 | 7/1963 | Henrickson _____ 264—54 XR |
| 3,123,656 | 3/1964 | Rochlin _____ 264—321 |

FOREIGN PATENTS

| 599,493 | 6/1960 | Canada. |
| 944,285 | 6/1956 | Germany. |
| 570,582 | 12/1957 | Italy. |

ALEXANDER H. BRODMERKEL, *Primary Examiner.*

P. E. ANDERSON, *Assistant Examiner.*